US007676549B2

(12) United States Patent
McKeon et al.

(10) Patent No.: US 7,676,549 B2
(45) Date of Patent: Mar. 9, 2010

(54) TECHNIQUES FOR PROVIDING ACCESSIBILITY OPTIONS IN REMOTE TERMINAL SESSIONS

(75) Inventors: Brendan McKeon, Seattle, WA (US); Makarand V Patwardhan, Redmond, WA (US); Nadim Y. Abdo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 11/139,427

(22) Filed: May 27, 2005

(65) Prior Publication Data

US 2006/0271637 A1    Nov. 30, 2006

(51) Int. Cl.
G06F 15/16    (2006.01)
G06F 3/00    (2006.01)

(52) U.S. Cl. ........................... 709/217; 715/740

(58) Field of Classification Search ................. 709/217; 707/3; 715/740
See application file for complete search history.

(56) References Cited

U.S. PATENT DOCUMENTS

| | | | | |
|---|---|---|---|---|
| 5,175,854 A * | 12/1992 | Cheung et al. | ............. | 718/100 |
| 5,374,924 A * | 12/1994 | McKiel, Jr. | ............. | 340/825.19 |
| 5,461,399 A * | 10/1995 | Cragun | ............. | 715/729 |
| 6,144,377 A * | 11/2000 | Oppermann et al. | ........ | 715/744 |
| 6,331,855 B1 | 12/2001 | Schauser | | |
| 6,334,157 B1 * | 12/2001 | Oppermann et al. | ........ | 719/310 |
| 6,437,803 B1 * | 8/2002 | Panasyuk et al. | ............ | 715/733 |
| 6,609,159 B1 * | 8/2003 | Dukach et al. | ............. | 719/331 |
| 6,615,176 B2 * | 9/2003 | Lewis et al. | ................. | 704/275 |
| 6,665,642 B2 * | 12/2003 | Kanevsky et al. | ........... | 704/260 |
| 6,801,224 B1 * | 10/2004 | Lewallen | .................... | 715/746 |
| 6,834,373 B2 * | 12/2004 | Dieberger | ................... | 715/247 |
| 6,851,118 B1 * | 2/2005 | Ismael et al. | ................ | 719/330 |
| 6,922,726 B2 * | 7/2005 | Basson et al. | ............... | 709/227 |
| 6,950,991 B2 * | 9/2005 | Bloomfield et al. | ......... | 715/738 |
| 7,000,185 B1 * | 2/2006 | Murren et al. | .............. | 715/203 |
| 7,139,832 B2 * | 11/2006 | Kameyama et al. | ........ | 709/237 |
| 7,194,411 B2 * | 3/2007 | Slotznick et al. | ............ | 704/271 |
| 7,222,177 B2 * | 5/2007 | Johnson | ...................... | 709/229 |
| 7,254,786 B2 * | 8/2007 | Henriquez | .................. | 715/835 |
| 7,340,747 B1 * | 3/2008 | Zeliger et al. | ............... | 719/328 |
| 2002/0015042 A1 * | 2/2002 | Robotham et al. | .......... | 345/581 |
| 2002/0057295 A1 * | 5/2002 | Panasyuk et al. | ............ | 345/804 |
| 2002/0065658 A1 * | 5/2002 | Kanevsky et al. | ........... | 704/260 |
| 2002/0156807 A1 * | 10/2002 | Dieberger | ................ | 707/501.1 |

(Continued)

OTHER PUBLICATIONS

Jean-Marie D'Amour and Catherine Roy, CAMO/NICT, "How Assistive Software Supports Web Accessibility": Study presented at CSUN 17th annual internation conference "Technology and Persons with Disabilities" Los Angeles, CA (Mar. 20, 2002).*

(Continued)

*Primary Examiner*—Saleh Najjar
*Assistant Examiner*—Robert Shaw
(74) *Attorney, Agent, or Firm*—Lee & Hayes, PLLC

(57) ABSTRACT

Techniques relating to enabling accessibility functionality in remote terminal session scenarios are described. In one instance, a process detects a request from an accessibility functionality regarding a display element in a remote terminal session. The process sends a query relating to the request to a component located on a computing device which generated the display element. The process also receives a response to the query.

19 Claims, 5 Drawing Sheets

U.S. PATENT DOCUMENTS

| | | | | |
|---|---|---|---|---|
| 2002/0178007 | A1* | 11/2002 | Slotznick et al. | 704/270.1 |
| 2002/0188734 | A1* | 12/2002 | Johnson | 709/229 |
| 2003/0208356 | A1* | 11/2003 | King et al. | 704/270 |
| 2003/0210266 | A1* | 11/2003 | Cragun et al. | 345/762 |
| 2004/0088377 | A1* | 5/2004 | Henriquez | 709/219 |
| 2004/0123239 | A1* | 6/2004 | Roessler | 715/513 |
| 2004/0218451 | A1* | 11/2004 | Said et al. | 365/222 |
| 2004/0255289 | A1* | 12/2004 | Alex George et al. | 717/174 |
| 2005/0091571 | A1* | 4/2005 | Leichtling | 715/500 |
| 2005/0114711 | A1 | 5/2005 | Hesselink et al. | |
| 2005/0138122 | A1* | 6/2005 | Boehringer et al. | 709/205 |
| 2005/0198189 | A1* | 9/2005 | Robinson et al. | 709/217 |
| 2006/0090139 | A1* | 4/2006 | Jenni et al. | 715/760 |
| 2006/0142878 | A1* | 6/2006 | Banik et al. | 700/17 |
| 2006/0168526 | A1* | 7/2006 | Stirbu | 715/740 |
| 2006/0168537 | A1* | 7/2006 | Hochmuth et al. | 715/778 |
| 2006/0236268 | A1* | 10/2006 | Feigenbaum | 715/853 |

OTHER PUBLICATIONS

IBM Home Page Reader 3.0 Brochure (2003).*

JAWS for Windows (2004).*

Warren Gay, Linux Socket Programming by Example, Que (Apr. 18, 2000) ISBN-10: 0-7897-2241-0 ISBN-13: 978-0-7897-2241-6.*

Todd Mathers, Windows Server 2003/2000 Terminal Server Solutions, Third Editiion Addison Wesley Professional (Dec. 29, 2004) ISBN-10: 1-57870-276-3 ISBN-13: 978-1-57870-276-3.*

Microsoft Computer Dictionary, Fifth Edition, Microsoft Press (2002) ISBN 10: 0-7356-1495-4 ISBN-13: 978-0-7356-1495-6.*

Todd Mathers, Windows Server 2003/2000 Terminal Server Solutions, Third Editiion Addison Wesley Professional (Dec. 29, 2004) ISBN-10: 1-57870-276-3 ISBN-13: 978-1-57870-276-3.*

PCT Search Report For Patent Application No. 309797.07 Mailed on Dec. 13, 2007, pp. 6.

* cited by examiner

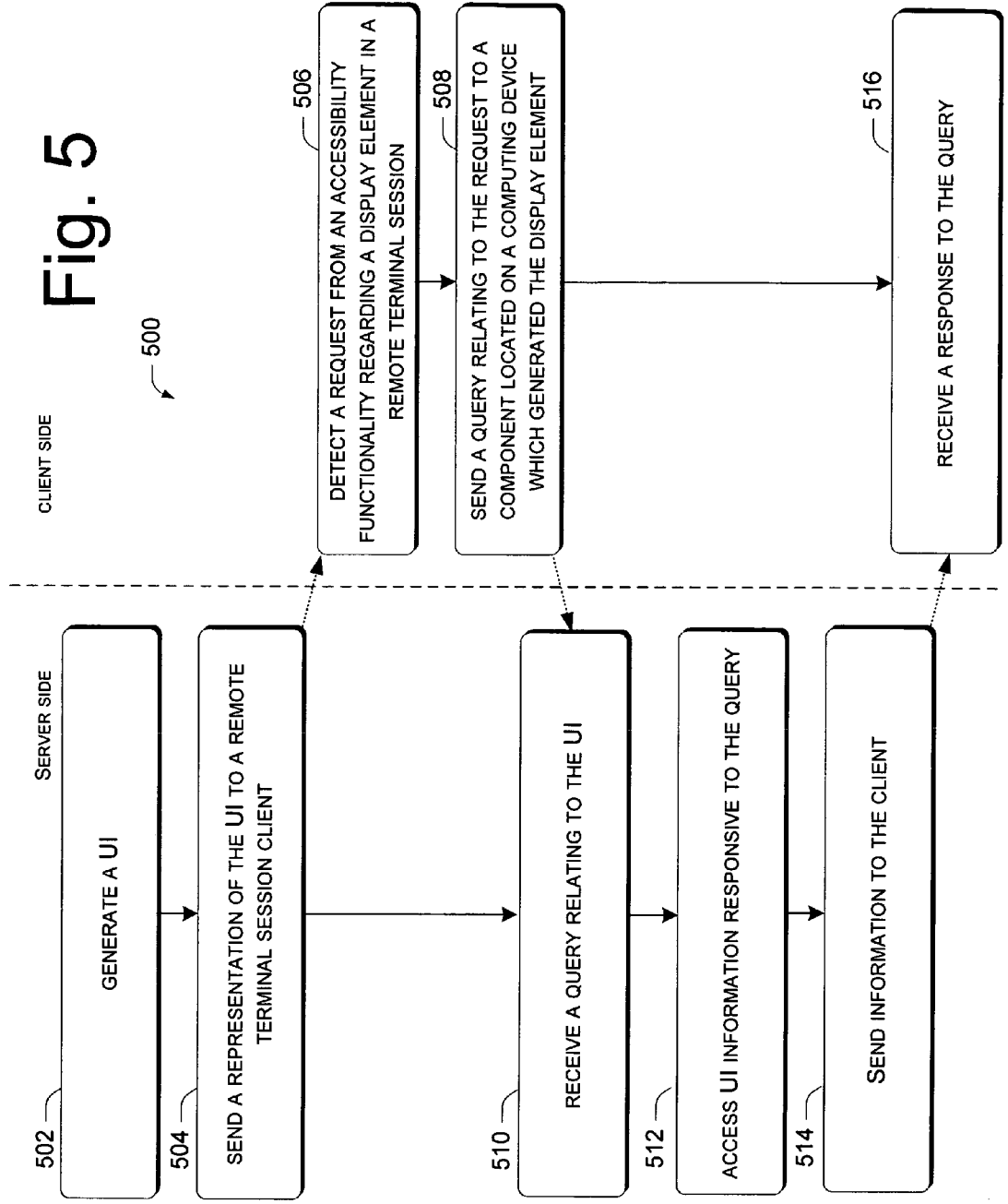

TECHNIQUES FOR PROVIDING ACCESSIBILITY OPTIONS IN REMOTE TERMINAL SESSIONS

BACKGROUND

Accessibility aids attempt to facilitate computer usage for individuals who have difficulty utilizing a standard user-interface configuration. For instance, an individual with reduced vision may want features of the user-interface increased in size and/or augmented by accompanying verbal descriptions so that the user can more easily locate and engage those features.

Remote terminal session support products, such as Terminal Services, offered by MICROSOFT® Corporation, enable a remote terminal session between a client computer and a server computer. The remote terminal session (RTS) can enable the client computer to connect over a network to the server computer to generate a remote desktop on the client computer. Traditionally, in a remote desktop scenario, an operating system and/or one or more applications run on the server computer to generate a user-interface (UI). A representation of the UI, such as a bit map image, is then sent to the client over the network. The bit map image data has limited value from an accessibility perspective. Solutions for providing accessibility options for remote terminal session scenarios are desired.

SUMMARY

Techniques relating to enabling accessibility functionality in remote terminal session scenarios are described. In one instance, a process detects a request from an accessibility functionality regarding a display element in a remote terminal session. The process sends a query relating to the request to a component located on a computing device which generated the display element. The process also receives a response to the query.

BRIEF DESCRIPTION OF THE DRAWINGS

FIG. 5 illustrates a process diagram of one exemplary implementation for enabling accessibility functionality in remote terminal session scenarios.

DETAILED DESCRIPTION

Overview

Figure 1:
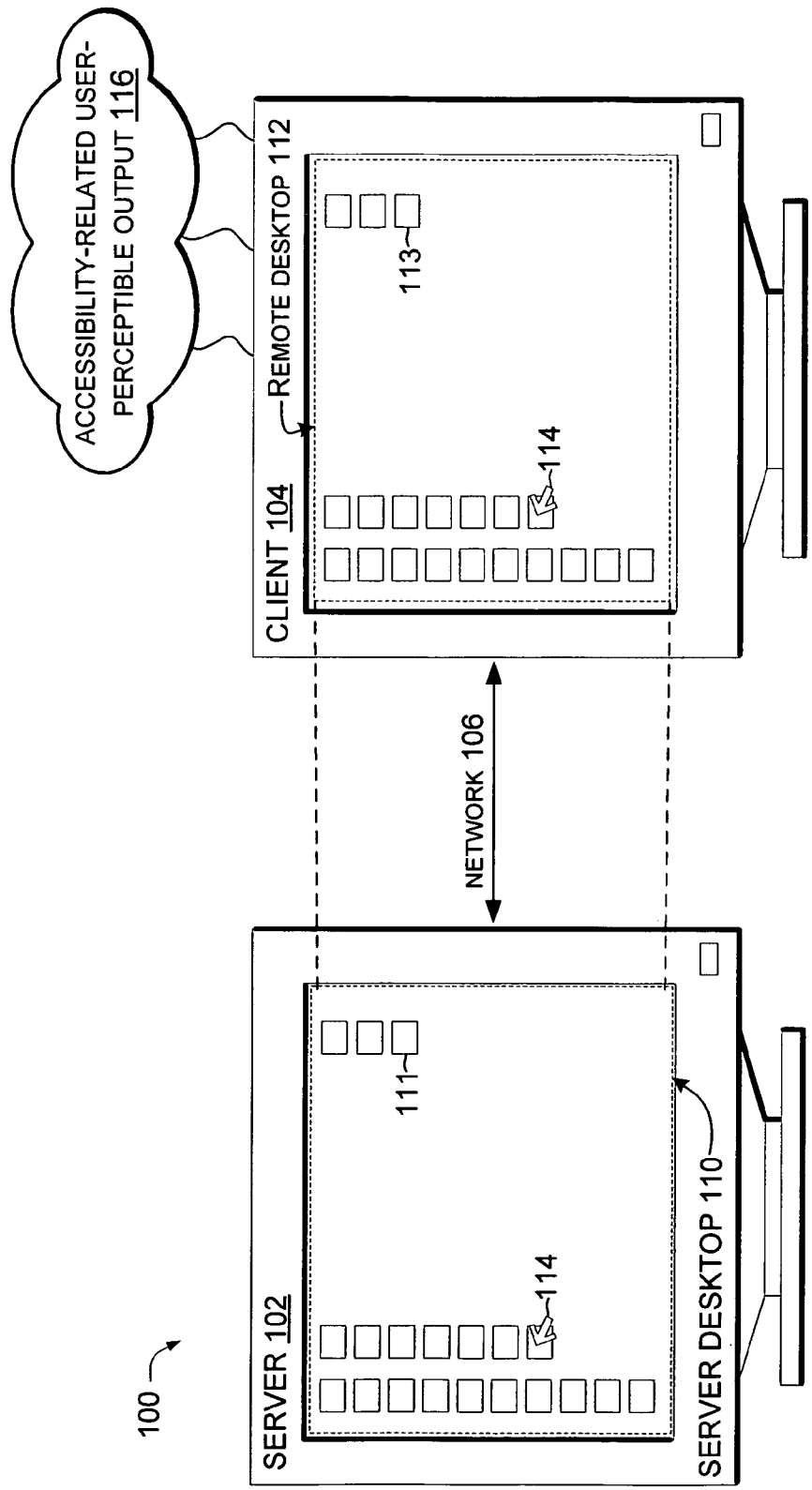
FIG. 1 illustrates an exemplary system for enabling accessibility functionality in remote terminal session scenarios.

The techniques described below relate to remote terminal session scenarios and enabling accessibility aids (AA) in remote terminal sessions. In this document AA relates to a functionality for accessing information relating to display elements or objects which may be displayed for a user. AAs are utilized in multiple user scenarios. For instance, AAs are utilized in various speech command-and-control scenarios, various testing scenarios, and in various scenarios to aid a user having vision and/or hearing impairment.

In a standalone computer configuration, the computer generates a user-interface (UI) which comprises one or more display elements such as icons, toolbars etc. A display element can be any portion of the UI which is associated with object data or information. An AA operating in the standalone configuration can obtain some or all of the information about specific display elements of the UI. The AA includes, or communicates with, a means for interacting with the UI, such as an accessibility aid-user-interface-interface (AA-UI-interface) which facilitates acquiring the requested display element information. The information relating to a display element is then utilized in some manner to aid the user. For instance, if the user places a cursor over a display element representing an icon for a recycle bin, the AA requests information relating to that display element. The AA receives and understands information relating to the specified display element. Examples of the type of information received include descriptions of buttons, lists, menus, etc., and their relative relationships, among other things. The AA then can aid the user, such as in the case of visual impairment, by causing the words "recycle bin" to be audibly generated for the user in but one example.

Remote terminal sessions (RTS) allow an operating system (OS) and/or application(s) operating on the server to generate a UI including one or more display elements. Remote terminal sessions further allow output or graphics of the UI to be forwarded to the client computer. Described another way, only a representation of the UI is sent to, and displayed on a client computer. The UI representation is visibly displayed for a user on the client computer. A user at the client computer can see and interact with the representation of the UI. The client computer has a reduced level of responsibility relative to the server in that the client is only responsible for displaying the representation received from the server and relaying user-input back to the server. The server computer processes the user input and updates the UI to reflect the user input, and sends an updated representation of the UI to the client computer. From a visual perspective of the user, the UI representation may be indistinguishable from the actual UI. However, from an accessibility perspective, the UI representation is associated with a reduced level of object data when compared to the actual corresponding UI.

The present techniques further enable an AA in a remote terminal session environment to achieve a functionality similar to the standalone configuration described above. For instance, the AA can request and receive information relating to specific portions of the client representation of the server's UI. The request is detected and the information gathered and presented to the AA. Some implementations detect the AA's request, obtain the corresponding information, and present the information to the AA in a manner which is transparent to the AA so that the AA need not even be aware that it is functioning in other than a standalone configuration.

For example, consider FIG. 1 which illustrates a system 100 configured to support a remote terminal session between a server 102 and a client 104 over a network 106 and which is configured to enable accessibility functionality relative to the remote terminal session. Server 102 generates a UI in the form of a server desktop 110. The server desktop can be comprised of one or more display elements such as display element 111 illustrated here. Examples of display elements can include icons, toolbars menus etc. The remote terminal session generates a representation of the UI in the form of a remote desktop 112 on client 104. The remote desktop rather than including the one or more display elements is merely a representation of the display elements which lacks much or all of the underlying information associated with the display elements of the server UI. For instance, display element 111 is represented as indicated by representation 113. To a user, display element representation 113 may appear essentially identical to display element 111, but from an accessibility perspective, display element representation 113 is associated with a reduced amount of associated information.

An accessibility aid functioning in relation to the client's remote desktop 112 can request information regarding a portion of the remote desktop. To satisfy the AA's request, at least some implementations, gather information at the server relating to a corresponding portion of the server UI. For instance, object data related to the requested portion of the client UI representation is effectively retrieved at the server from the actual server UI and brought to the AA. For instance, assume that the AA requests information relating to a display element of the remote desktop. The request is detected, and information relating to the requested portion of the remote desktop is obtained and presented to the AA. For example, the information may be obtained in relation to a corresponding portion of the server desktop. The information can be presented to the AA such that the AA need not possess any functionality beyond which would be utilized if the remote desktop was instead a UI generated locally on client 104.

For purposes of illustration, assume in another example that the AA requests information regarding a portion of the remote desktop 112 proximate cursor 114. The AA's request is detected and information is obtained from server 102 regarding the portion of the server desktop 110 proximate cursor 114. The obtained information, or some derivative thereof, is supplied to the AA.

Responsive to the supplied information, the AA can enable an accessibility-related user-perceptible output 116 to be generated at client 104 for the user. The accessibility-related user-perceptible output 116 can include an audio and/or video signal which augments the remote desktop as should be recognized by the skilled artisan. For example, assume for purposes of explanation that cursor 114 is positioned over a display element in the form of an internet browser icon. In such an instance, accessibility-related user-perceptible output 116 may be manifested as the words 'internet browser' audibly generated for the user.

As mentioned above, in at least some implementations, the AA need not even be aware that only a representation of the user-interface exists on client 104 or that the AA is operating relative to a remote terminal session. Stated another way, in some implementations a significant subset of information regarding the remote desktop is made available locally at the client for the AA. In some of these implementations, techniques are supported which allow the information to be made available in a manner which is transparent to the AA. For instance, the information is made available locally in a transparent manner when the AA utilizes a supported technique to access the information. In such configurations, the AA may be blind to the existence of a remote terminal session and still function consistent within expected accessibility functionality parameters.

The implementations described above and below are described in the context of a computing environment as commonly encountered at the present point in time. Various examples can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various examples may be implemented in computer system configurations other than a PC. For example, various implementations may be realized in hand-held devices, multiprocessor systems, microprocessor-based or programmable consumer electronics, network PCs, minicomputers, mainframe computers, cell phones and the like. Further, as technology continues to evolve, various implementations may be realized on yet to be identified classes of devices. For example, as the cost of a unit of processing power continues to drop and wireless technologies expand, computing devices resembling today's cell phones may perform the functionalities of today's PC, video camera, cell phone, and more in a single mobile device. This single device may in one scenario act as a server and in another scenario act as a client. This is but one of many existing and developing examples for the described implementations.

The terms server and client as used herein do not connotate any relative capabilities of the two devices. The client may have more, less, or equal processing capabilities than the server. Rather, in this document, the names server and client describe the relative relationship of the two components. For example, a computing experience of a first or server device is remoted to a second or client device.

Although the various implementations may be incorporated into many types of operating environments as suggested above, a description of but one exemplary environment appears in FIG. 4 in the context of an exemplary general-purpose computing device and which is described in more detail later in this document under the heading "Exemplary Operating Environment".

Exemplary Implementations and Processes

Figure 2:
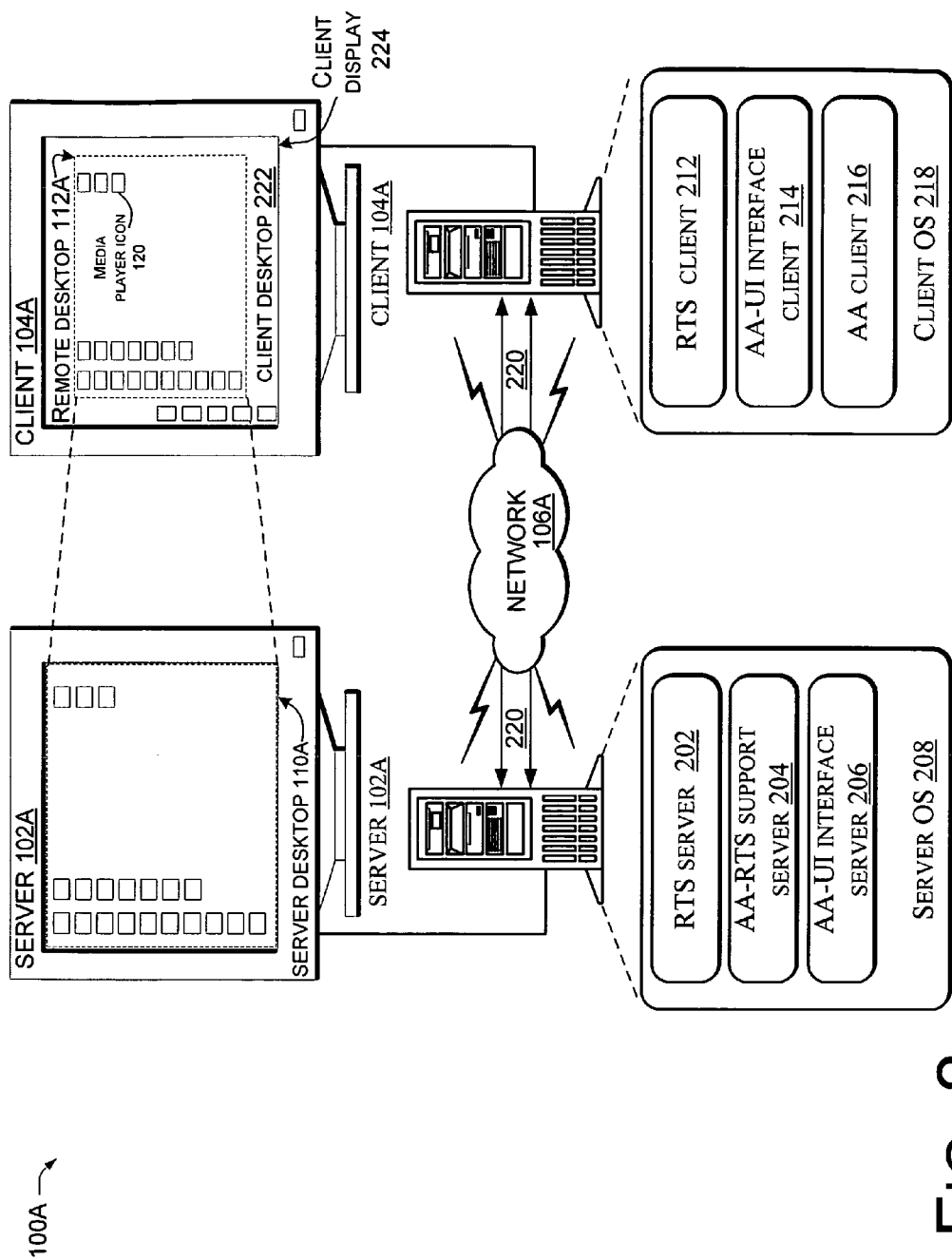
FIG. 2 illustrates an exemplary system for enabling accessibility functionality in remote terminal session scenarios.

Consider FIG. 2 which illustrates a system 100A configured to enable accessibility functionalities to be achieved in a remote terminal session. System 100A is configured to support a remote terminal session between a server 102A and a client 104A over a network 106A. System 100A also is configured to enable accessibility functionality to be achieved for client 104A during the remote terminal session. In this system implementation, server 102A includes a RTS-server component 202, an AA-RTS-support-server component 204, an AA-UI-interface-server component 206, and a server operating system (OS) 208. Client 104A includes a RTS-client component 212, an AA-UI-interface-client component 214, an AA-client component 216, and a client OS 218.

In this configuration, server 102A is configured to generate a UI which is implemented in the form of a server desktop 110A for purposes of illustration. Server desktop is illustrated here for purposes of explanation, but in many scenarios a visual image of the server desktop is not actually generated on the server. The RTS-server component 202 and the RTS-client component 212 are configured to establish one or more communication channels 220 between server 102A and client 104A over network 106A for the remote terminal session. The RTS-server component 202 is configured to generate a representation of the server desktop for display on the client 104A. The representation is sent over communication channel 220 and is displayed on client 104A as remote desktop 112A in this example. In this instance, the remote desktop 112A lies within, and is surrounded by a border or window. The border serves to distinguish the remote desktop 112A from the locally generated client desktop 222 on client display 224. In other configurations it may not be readily apparent to the user which components are locally generated and which components are remotely generated.

The remote terminal session, via RTS-client component 212 and RTS-server component 202, is further configured to enable accessibility functionality relative to the remote terminal session, such as an accessibility functionality representative component. For instance, the remote terminal session can host accessibility components at the client and/or server. Alternatively or additionally, the remote terminal session can provide a communication means for AA components located on the server 102A and the client 104 to communicate regarding UI information desired for accessibility purposes.

AA-client component 216 is configured to request information from, or otherwise interact, with the UI occupying client display 224 via AA-UI-interface-client component 214. AA-UI-interface-client component 214 is an interface such as an application program interface (API) configured to interact with the UI to obtain information for an AA. In some configurations, an AA-UI-interface is an application program interface (API) and system library configured to present information relating to a UI display element(s) to a client application. In but one such configuration, the AA-UI-interface presents the UI information as a tree of nodes where each node represents a UI display element. In at least some configurations, the AA-UI-interface is configured to provide access to structure, properties, interactivity, and events for the nodes. Potential non-limiting examples of AA-UI-interfaces include UI Automation and Microsoft Active Accessibility (MSAA), both of which are trademarked products offered by MICROSOFT® Corp. The skilled artisan should recognize other suitable AA-UI-interfaces, some of which may be more performant than others relative to the concepts described above and below.

In this instance, client display 224 includes a client desktop portion 222 which is a locally generated UI and the remote desktop portion 112A which is a representation of a remotely generated UI. In this instance, remote desktop 112A is a bitmap representation of the server's UI or server desktop 110A. Remote desktop 112A contains a reduced amount of information for accessibility purposes when compared to a locally generated UI such as client desktop 222.

Consistent with system 100A, AA-client component 216 can request and receive information regarding a specified portion of client display 224. If the requested information is available locally on the client then the information is obtained at the client and provided to the AA-client component 216. Such an instance may occur if the AA's request relates to the client desktop 222. If the requested information is not available on the client, such as a request directed to a portion of remote desktop 112A, then the information is obtained remotely. For instance, in this particular configuration, if AA-client 216 requests information regarding remote desktop 112A, then the request is detected and understood by a client side component, such as RTS-client 212, and is directed to the server 102A. In this particular configuration, the request is directed to the AA-RTS-support-server component 204 over network 106A. The request may be sent over channels 220 associated with the remote terminal session or may be separate 'out of band' channels.

AA-RTS-support-server component 204 acts on behalf of AA-client component 216 and is configured to obtain the requested information related to the server desktop 110A. AA-RTS-support-server component 204 acts in cooperation with AA-UI-interface-server component 206 to obtain the information at the server 102A. AA-RTS-support-server component 204 relays the information back to the client and ultimately to client's AA-client component 216. The system configuration of FIG. 2 is but one configuration which allows the AA-client component 216 to obtain UI information in a RTS session regardless of whether the UI information exists on the client 104A or the server 102A.

In some configurations, AA-client component 216 need not be aware whether the request relates to the locally generated UI or a mere representation of a remote or server generated UI. In such configurations a means to determine if the request relates to the client UI or a representation of a remote UI may exist on client 104A, such as within RTS-client component 212. The RTS-client component then obtains the information locally or remotely as appropriate.

Figure 3:
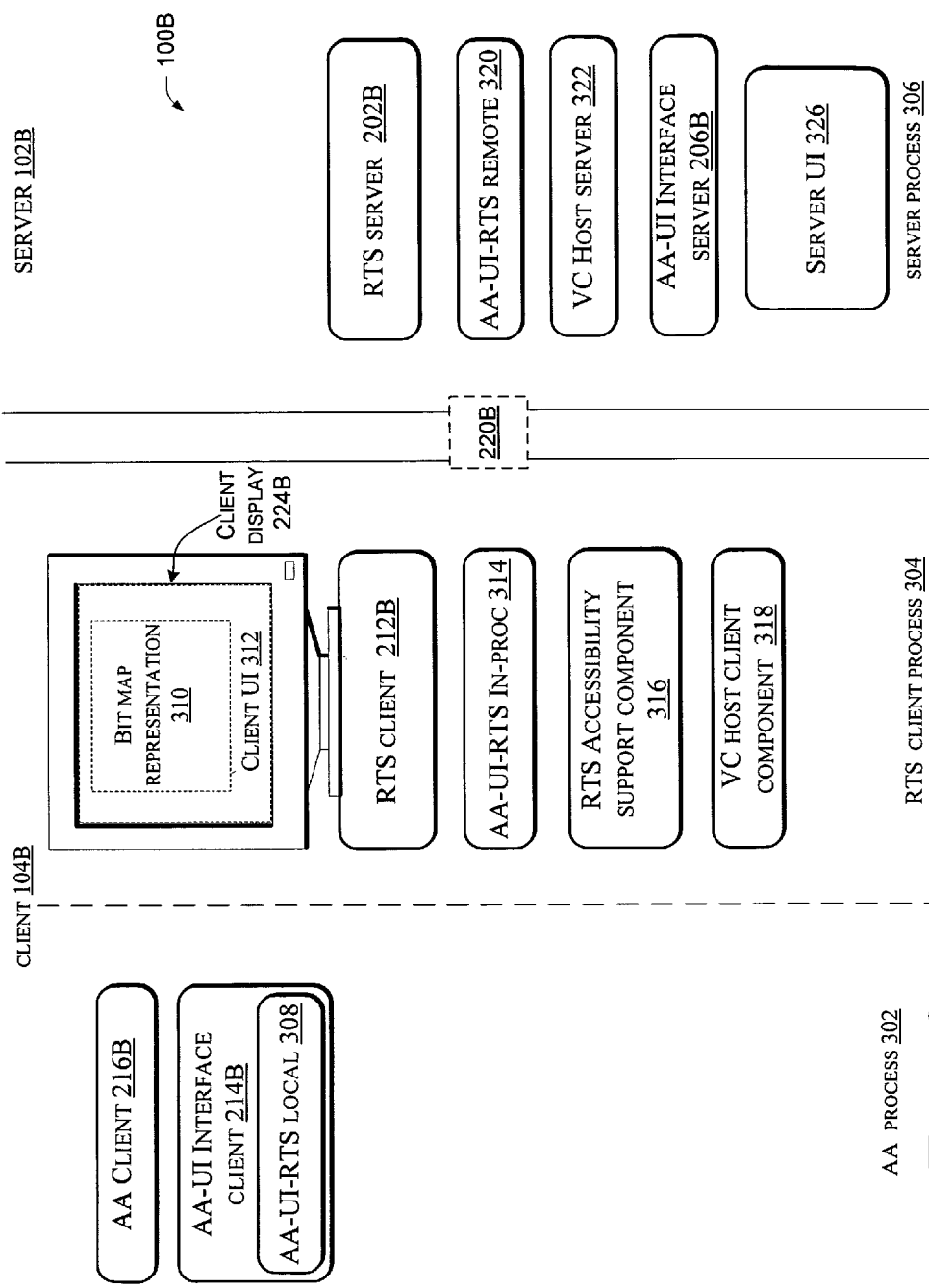
FIG. 3 illustrates an exemplary system for enabling accessibility functionality in remote terminal session scenarios in more detail.

FIG. 3 offers a non-limiting implementation consistent with the concepts described above and below. FIG. 3 represents a system 100B which includes a client 104B and a server 102B and within which an accessibility functionality operating on client 104B can be provided with requested information regarding a UI whether the UI is generated on a machine on which the accessibility functionality is operating or a remote machine. This particular system configuration provides an example of how, relative to a remote terminal session, RTS components can provide infrastructure on both the client and server sides to host AA supplied components which can obtain accessibility related information regarding a UI.

In this implementation, RTS components can provide AA components with means to pass a request for desired UI information from the client side to the server side and can provide a means to pass the obtained information from the server side back to the client side. For purposes of explanation, FIG. 3 divides processes occurring on client 104B into two process types: an AA process type 302; and a RTS process type 304. Also, processes which occur on server 102B are indicated as server process type 306. The server processes are grouped together into a single process for ease of explanation and due to limits of the printed page. In other configurations, the server UI 326 may be contained in a server process which is separate and distinct from other server side components and/or processes. Further, multiple instance of the server UI may exist in relation to other components listed on server process 306.

System 100B includes, associated with AA process 302, an AA-client component 216B, and an AA-UI-interface component 214B. Also included in AA process 302 is an AA-UI-RTS-local component 308 which in this instance is a sub component of AA-UI-interface component 214B. AA-UI-RTS-local component 308 acts to extend AA-UI functionality beyond the local or standalone scenario.

In this particular implementation, and in relation to RTS client process 304, system 100B includes a client display 222B upon which are displayed a bit map representation 310 of a server UI and a client generated UI 312. RTS client process 304 also includes a RTS-client component 212B, an AA-UI-RTS-in-proc component 314, a RTS-accessibility-support component 316, and a VC-host-client component 318. The RTS-accessibility-support component 316 contains information about accessibility aids which facilitates communication between the RTS client components and the AA client components.

Relative to the server process 306, FIG. 3 includes a RTS-server component 202B, an AA-UI-RTS-remote component 320, a VC-host-server component 322, an AA-UI-interface-server component 206B, and a server UI 326. Collectively, RTS-client component 212B, RTS-accessibility-support component 316, VC-host-client component 318, RTS-server component 202B, and VC-host-server component 322 serve to enable AA-client component 216B to acquire data regarding display elements represented on bit map representation 310. Since the bit map representation is a representation of server UI 326, a broader scope of accessibility related information is available from the server UI. The above mentioned components allow accessibility related information to be obtained from the server 102B and the obtained information to be sent back for use by the AA-client component 216B. The above mentioned components will be described in more detail below by way of example.

Discovery

In this particular configuration, upon start-up of the RTS-client component 212B, the RTS-client component loads RTS-accessibility-support component 316 and the VC-host-client component 318 and causes the VC-host-server component 322 to be loaded. Further, the RTS-client component exposes a window interface for receiving communications, such as from AA-client component 216B. The interface also allows AA-UI-interface component 214B to load the AA-UI-RTS-in-proc component 314 into the RTS-client process 304. Once the interface is exposed, the AA-UI-interface component 214B can encounter or discover the RTS-client component 212B. For instance, in one instance the AA-UI-interface component 214B encounters the RTS-client handle or HWND while traversing an associated HWND tree. A HWND is a handle that represents a window. In a WINDOWS® brand operating system many of the UI elements are implemented as windows. Each window is associated with a handle or HWND. Generally, AA clients are provided with a tree of such hwnds, to represent various windows and their relationship. The AA client uses the window handle to identify a window that it wants to get more information about from the AA-UI-interface-client component 214B. For example, the AA client may be navigating the tree, or noticing input focus relative to the RTS-client, or hit-testing to the RTS-client. Responsive to detecting the RTS-client, the AA-UI-interface-client component 214B or AA-UI-RTS-local component 308 loads AA-UI-RTS-in-proc component 314 in the RTS-client process 304. This is but one example, other implementations may utilize recognize whatever data type is utilized to represent a UI on a particular platform.

In an instance where the HWND belongs to the RTS-client process, the AA-client 216B, via its representative AA-UI-RTS-local component 308 can send a communication to the RTS-client 212B utilizing the window interface provided by the RTS-client 212B. In one such instance, the AA-UI-RTS-local component 308 sends a process message such as WM_GETOBJECT to the RTS-client 212B via the exposed interface.

The RTS-client 212B forwards the AA client's process message to AA-UI-RTS-in-proc component 314 and the accessibility support component 316. Responsively, the accessibility support component exposes the RTS-client process such that AA-UI-RTS-local component 308 can load AA-UI-RTS-remote component 320 on the server side and access associated virtual channels 220B. The accessibility support component further allows the AA-UI-RTS-in-proc component 314 to get access to various terminal services properties of the RTS-client desktop that are utilized by AA-UI-RTS-in-proc component 314 for proper handling of the requests. Such properties may relate to scroll bars, visible, invisible and enabled, among others. For example AA-UI-RTS-in-proc component 314 is responsible for post-processing of various properties such as locational properties described below. To enable such post-processing AA-UI-RTS-in-proc component 314 utilizes window coordinates information that display the server desktop in the RTS-client 212B. For instance, if the RTS-client window is using scrollbars, AA-UI-RTS-in-proc component 314 utilizes the positions of scrollbars to map correctly. In another example, in some remote terminal session scenarios, the client desktop displayed by the RTS-client 212B is a representation of a single window on the server, and not a whole desktop per se. AA-UI-RTS-in-proc component 314 utilizes information relating to such an RTS configuration and to which server desktop window does the client desktop correspond. The RTS-accessibility support component 316 provides this information for the AA-UI-RTS-in-proc 314.

Responsive to the AA client process message, the AA-UI-RTS-in-proc component 314 checks the legitimacy of the process message and opens a communication means and calls AA-UI-RTS-local component 308. For instance, AA-UI-RTS-in-proc can check that the WM_GETOBJECT message includes a parameter indicating that it is from AA-UI-interface-client component 214B or other accessibility component. The AA-UI-RTS-in-proc 314 handles WM_GETOBJECT by creating a named pipe. AA-UI-RTS-in-proc then returns some key to the pipe back to caller, i.e. AA-UI-RTS-local component 308. This is but one example of how the AA-UI-RTS-local component 308 establishes a communication channel with the AA-UI-RTS-in-proc component 314. The skilled artisan should recognize other configurations.

In this instance, AA-UI-RTS-local component 308 receives the returned pipe key from the WM_GETOBJECT message, and connects to the pipe to establish communications between the AA client process 302 and the RTS-client process 304.

Responsive to the RTS-client 212B command mentioned above, the VC-host-client component 318 sends a command to start the VC-host-server component 322. The VC-host-server component causes the AA-UI-RTS remote component 320 to establish a link with AA-UI-RTS-in-proc 314. As mentioned above a communication means was extended from the AA client process to the RTS client process, this communication means is now effectively extended to processes on server 102B. In this instance, the connection extends from the AA-UI-RTS-local 308 to the AA-UI-RTS-in-proc 314 and then to the AA-UI-RTS-remote component 320.

Requesting Information

A request for accessibility related information from AA client 204B is propagated from client side AA-UI-interface-client 214B to the AA-UI-RTS-local component 308. In one instance, the AA-UI-RTS-local component builds up a byte message containing a reference to the requested display element or object, a list of properties to retrieve, and a filter that identifies the elements of interest to the AA-UI-RTS-local component 308. For example, when the request is for children of a particular display element, the filter could specify "only visible elements" that way instead of returning all the children of the particular display elements, only visible children will be returned. The AA-UI-RTS-local component 308 then sends the message over the named pipe to AA-UI-RTS-in-proc component 314 and waits for a response.

The AA-UI-RTS-in-proc component 314 receives the message, tags it with an ID to identify which AA-UI-RTS-local component sent the message. The AA-UI-RTS-in-proc component 314 forwards the message to AA-UI-RTS-remote component 320. The AA-UI-RTS-remote component receives the message, de-serializes the message (including looking up the object reference to determine the target UI element), and uses the AA-UI-interface APIs of AA-UI-interface server component 206B to collect the requested information via an interface exposed by the AA-UI-RTS-remote component 320. The AA-UI-interface-server component 206B can share some or all of the functionality of AA-UI-interface-client component 214B such that the AA-UI-interface-server component 206B can operate on behalf of AA-UI-interface-client component 214B. The AA-UI-interfaceserver component 206B obtains the requested accessibility information from the server UI 326.

The AA-UI-RTS-remote component 320 serializes the collected information into a byte message, and sends it back over the virtual channel 220B to the AA-UI-RTS-in-proc component 314, with the tag ID intact.

The AA-UI-RTS-in-proc component 314 forwards the message from AA-UI-RTS-remote component 320 via the virtual channel to the appropriate AA-UI-RTS-local component via the named pipe using the tag ID to determine correct AA-UI-RTS-local component. For ease of explanation only one AA-UI-RTS-local component 308 is illustrated, but as mentioned below, in some implementations, multiple instances of this, as well as other components, may be running. AA-UI-RTS-local component 308 receives the response message and de-serializes the message. In some instances, the AA-UI-RTS-local component 308 post-processes the message. For instance the message may be post-processed regarding property values to apply offsets or otherwise adjust properties that are affected by RTS hosting. Once any appropriate post-processing is completed the AA-UI-RTS-local component 308 sends the processed information to the AA-UI-interface-client component 214B.

One example of such post-processing relates to information regarding the location of the requested element on the display. For instance, assume that the AA-client requests accessibility related information about an element at the extreme top left of bit map representation 310. The information is obtained on the server side in relation to the server UI 326. However, any associated location information is in relation to the server UI which in this instance is represented in bit map representation 310 within client UI 312. In this instance, the location information from the server UI is adjusted relative to the overall client display 224B. So, in this instance, expressed qualitatively, the element that is at the extreme upper left of the bit map representation is generally in the middle of the upper left quadrant of client display 224B. The skilled artisan should recognize how to undertake conversions in a quantitative manner. The relative position adjustments and other post-processing may be accomplished by any combination of the client components. For instance, the AA-UI-RTS-local component 308 or the AA-UI-interface client component 214B can process such adjustments.

Further, processing resources may be saved in some implementations by minimizing the number of components which are launched at start-up of a remote terminal session. The remaining components are launched responsive to some cue, such as an information request from the AA-client 216B. Other implementations may launch and enable most or all of the components upon start-up.

System 100B is described above in a relatively simple scenario where client display 224B includes a single client generated UI 312 and a single bit map representation 310. The skilled artisan should recognize that this system configuration is readily scalable across multiple facets. For instance, multiple AA client applications can run simultaneously in relation to the client display 224B. Alternatively or additionally, the server side components such as the AA-UI-RTS-remote 320 can handle a many-to-one relationship with many ongoing remote terminal sessions. Further still, other implementations may employ multiple representations of remote UIs on client display 224B. To a user of the client machine, the representations may be clearly demarcated by a border such as a window, or indistinguishable from a locally generated UI.

In an instance of many AA clients simultaneously running in relation to the RTS client window, some means of distinguishing the various AA clients is utilized. In one such configuration a communication means or pipe is dedicated to each AA client. The various pipes can connect individual AA clients to a shared AA-UI-RTS-in-proc 314 and VC-host-client 318.

The AA-UI-RTS-in-proc 314 component can be configured to multiplex client requests and events between the per-client pipes and the single VC-host-client component. In one such configuration, the AA-UI-RTS-in-proc 314 assigns unique identifiers for each AA client and appends packets sent to AA-UI-RTS-remote 320, which treats the values as opaque but keeps them intact and sends them back with events so that the AA-UI-RTS-in-proc knows to which client to forward the event.

In such a scenario, any adjustment of coordinates relative to client display 222B can be handled by each client's AA-UI-RTS-local component. Such a configuration avoids having the AA-UI-RTS-in-proc component understand the semantic content of any of the messages it is forwarding between the pipes and the VC. Finally, it allows the AA-UI-RTS-remote component to be 'client agnostic', as it does not have to be aware of individual clients or track a client specific state on their behalf. Placing the multiplexing burden on the AA-UI-RTS-local component also helps keep the client-specific state out of the AA-UI-RTS-remote component.

As mentioned above, at least some implementations can handle scenarios involving multiple bit map representations on client display 222B. For instance, multiple remote applications may be represented as individual bit map representations on client display 222B. In some of these configurations, RTS functionality allows the AA-UI-interface to create multiple virtual channels. Other configuration may utilize a single virtual channel and a single corresponding AA-UI-RTS-local component which multiplexes relative to the individual server side applications represented as bit maps on the client display 224B. Some configurations can then establish a pipe between an AA-UI-RTS-local component and the AA-UI-RTS-in-proc component such that the pipe itself is identified with a specific server side application. Another configuration may utilize one pipe per client such that each AA-UI-RTS-local component would use one pipe to talk to the AA-UI-RTS-in-proc component, regardless of which RTS Window it is working against. The AA-UI-RTS-local component adds a parameter to its messages that allows the AA-UI-RTS-in-proc component to determine to which window the request relates. Other configurations may utilize the handle or HWND for each application window from the server as another mapable aspect of the RTS-client state that can be mapped by the AA-UI-RTS-local component.

For instance, the AA-UI-RTS-local component can send a message to the AA-UI-RTS-in-proc component including the HWND of the local RTS-client window. The AA-UI-RTS-in-proc component can respond with information about that RTS-client window state, such as its viewport, state, and also the remote HWND. The viewport relates to information about the location of the RTS-client desktop. The AA-UI-RTS-local can then send this HWND as a parameter in its messages to the AA-UI-RTS-remote component. This approach can allow the AA-UI-RTS-in-proc component to treat nearly all messages as being opaque (other than those specifically asking for RTS window state). This allows the one-pipe-per-client approach to be used. In effect, the AA-UI-RTS-local component is responsible for multiplexing between multiple RTS windows. In such a configuration, calls that the AA-UI-RTS-local component make to the AA-UI-RTS-remote component will contain a HWND parameter indicating which HWND should be treated as the root or root window. The term root window refers to the top level window. As mentioned above, in some scenarios multiple RTS-clients represent corresponding windows on the server desktop. These windows are not enclosed by the top level RTS-client window, although they are representing some window on the same server session. In such instances there could be two independent requests from the AA-client to the AA-UI-RTS-in-proc. There are multiple ways of handling such scenario. For instance, AA-UI-RTS-in-proc can use a dedicated virtual channel for each such top level window with AA-UI-RTS-remote. In such a configuration, the channel itself identifies to which window the AA-client is referring. Alternatively or additionally, AA-UI-RTS-in-proc could use a single virtual channel with the server, and multiplex requests coming for various top level RTS-client windows. In this approach, AA-UI-RTS-in-proc utilizes additional data for each request to identify to which window AA-UI-interface client is referring. This additional information may be in the form of the handle of the top level window (root window).

The system 100B is an example of but one configuration for enabling accessibility functionality in a remote terminal session scenario. The configuration of system 100 also is an example of a system which lends itself to adding modular or plugin components upon a base functionality rather than rewriting the instructions of the base functionality itself. For example, in this instance, various components such as the RTS-accessibility-support component 316, and the VC-host-client component 318 are added upon the base functionality of the RTS-client component 212B as distinct modules or plugins. Among other advantages, such a system may have a shorter development cycle and/or be more reliable than customizing the RTS-client component to provide the desired functionality. Further still, the above examples are described in relation to an entire remote desktop. In other instances, the client window can contain a subset of the remote desktop as opposed to the entire desktop. For example, this subset may be a specific remote application window, and the UI that that application window contains. The application could contain one or more UI elements, and for instance, may include a sub-tree of UI elements.

Exemplary System Environment

Figure 4:
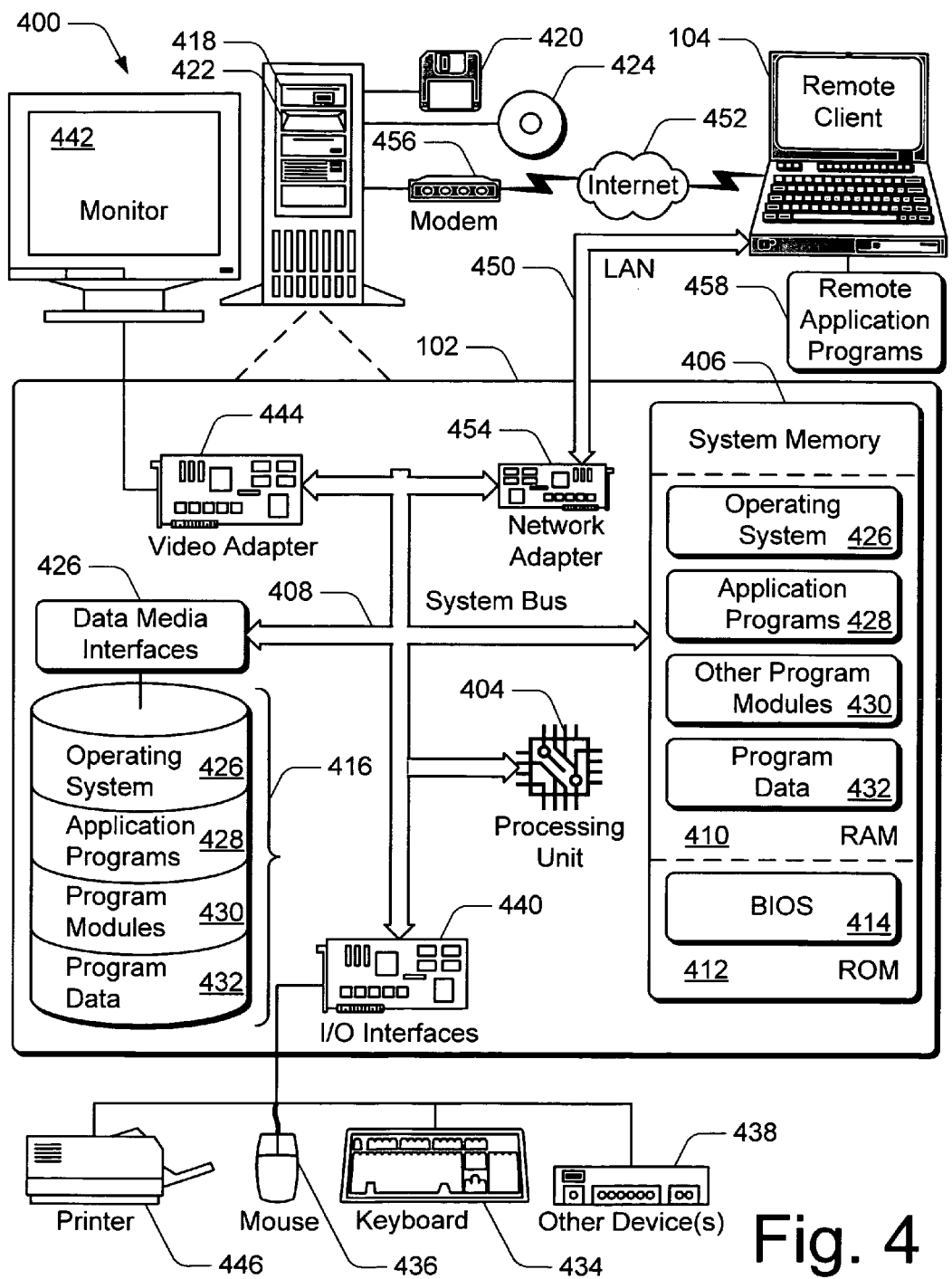
FIG. 4 illustrates exemplary systems, devices, and components in an environment for enabling accessibility functionality in remote terminal session scenarios.

FIG. 4 represents an exemplary system or computing environment 400 for enabling accessibility functionality in remote terminal sessions. System environment 400 includes a general-purpose computing system in the form of a server device or server 102. The components of server 102 can include, but are not limited to, one or more processors 404 (e.g., any of microprocessors, controllers, and the like), a system memory 406, and a system bus 408 that couples the various system components. The one or more processors 404 process various computer executable instructions to control the operation of server 102 and to communicate with other electronic and computing devices. The system bus 408 represents any number of several types of bus structures, including a memory bus or memory controller, a peripheral bus, an accelerated graphics port, and a processor or local bus using any of a variety of bus architectures.

Computing environment 400 includes a variety of computer readable media which can be any media that is accessible by server 102 and includes both volatile and non-volatile media, removable and non-removable media. The system memory 406 includes computer-readable media in the form of volatile memory, such as random access memory (RAM) 410, and/or non-volatile memory, such as read only memory (ROM) 412. A basic input/output system (BIOS) 414 maintains the basic routines that facilitate information transfer between components within server 102, such as during start-up, and is stored in ROM 412. RAM 410 typically contains data and/or program modules that are immediately accessible to and/or presently operated on by one or more of the processors 404.

Server 102 may include other removable/non-removable, volatile/non-volatile computer storage media. By way of example, a hard disk drive 416 reads from and writes to a non-removable, non-volatile magnetic media (not shown), a magnetic disk drive 418 reads from and writes to a removable, non-volatile magnetic disk 420 (e.g., a "floppy disk"), and an optical disk drive 422 reads from and/or writes to a removable, non-volatile optical disk 424 such as a CD-ROM, digital versatile disk (DVD), or any other type of optical media. In this example, the hard disk drive 416, magnetic disk drive 418, and optical disk drive 422 are each connected to the system bus 408 by one or more data media interfaces 426. The disk drives and associated computer readable media provide non-volatile storage of computer readable instructions, data structures, program modules, and other data for server 102.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, application programs 428, other program modules 430, and program data 432 (or some combination thereof) may include an embodiment of the systems and methods described herein.

A user can interface with server 102 via any number of different input devices such as a keyboard 434 and pointing device 436 (e.g., a "mouse"). Other input devices 438 (not shown specifically) may include a microphone, joystick, game pad, controller, satellite dish, serial port, scanner, and/or the like. These and other input devices are connected to the processors 404 via input/output interfaces 440 that are coupled to the system bus 408, but may be connected by other interface and bus structures, such as a parallel port, game port, and/or a universal serial bus (USB).

A monitor 442 or other type of display device can be connected to the system bus 408 via an interface, such as a video adapter 444. In addition to the monitor 442, other output peripheral devices can include components such as speakers (not shown) and a printer 446 which can be connected to server 102 via the input/output interfaces 440.

Server 102 can operate in a networked environment using logical connections to one or more remote computers, such as remote client device or client 104. By way of example, the remote client 104 can be a personal computer, portable computer, a server, a router, a network computer, a peer device or other common network node, and the like. The remote client 104 is illustrated as a portable computer that can include many or all of the elements and features described herein relative to server 102.

Logical connections between server 102 and the remote client 104 are depicted as a local area network (LAN) 450 and a general wide area network (WAN) 452. Such networking environments are commonplace in offices, enterprise-wide computer networks, intranets, and the Internet. When implemented in a LAN networking environment, the server 102 is connected to a local network 450 via a network interface or adapter 454. When implemented in a WAN networking environment, the server 102 typically includes a modem 456 or other means for establishing communications over the wide area network 452. The modem 456, which can be internal or external to server 102, can be connected to the system bus 408 via the input/output interfaces 440 or other appropriate mechanisms. The illustrated network connections are exemplary and other means of establishing communication link(s) between the computing devices 402 and 448 can be utilized.

In a networked environment, such as that illustrated with computing environment 400, program modules depicted relative to the server 102, or portions thereof, may be stored in a remote memory storage device. By way of example, remote application programs 458 are maintained with a memory device of remote client 104. For purposes of illustration, application programs and other executable program components, such as the operating system 426, are illustrated herein as discrete blocks, although it is recognized that such programs and components reside at various times in different storage components of the server 102, and are executed by the processors 404 of the server.

Exemplary Processes

FIG. 5 illustrates an exemplary process 500 for enabling accessibility functionality in remote terminal sessions. The order in which the process is described is not intended to be construed as a limitation, and any number of the described process blocks can be combined in any order to implement the process. Furthermore, the process can be implemented in any suitable hardware, software, firmware, or combination thereof.

For purposes of explanation, the following process blocks are described in the context of a remote terminal session scenario which defines a server side and a client side of a remote terminal session. As such, in this particular process configuration, process blocks 502, 504, 510, 512, and 514 occur on the server side, while process blocks 506, 508, and 516 occur on the client side.

At block 502, the process generates a UI. The UI can include one or more display elements such as icons, toolbars, menus, etc. The UI can be utilized for the remote terminal session in relation to a RTS-client. The UI may be a complete UI such as a server desktop, a single application, or some other configuration.

At block 504, the process sends a representation of the UI to the RTS-client. In one such instance, the RTS functionality causes a bit map representation of the UI to be generated and sent to the RTS-client.

At block 506, the process detects a request from an accessibility functionality regarding a display element of the UI in a remote terminal session. In this particular process configuration, such detection occurs on the client side. In other configurations, such detection may occur on the server side. The request may relate to some portion of the UI representation received from the server in the remote terminal session. The request may be received directly from an AA component or some intermediary component such as an AA-UI-interface operating in cooperation with the AA component. In some configurations, the requesting accessibility functionality may recognize that the request relates to a portion of a UI which is merely a representation of a UI. In other configurations, the requesting accessibility functionality may not have any ability to distinguish between an actual UI and a representation of a UI. In the latter configuration, a functionality may be included which determines whether the request relates to an actual UI, such as a locally generated UI or a representation of a remotely generated UI (from the perspective of the client machine). This functionality may then handle the request locally or by directing the request to a remote component as appropriate. The following scenario assumes that the request relates to a remotely generated UI or its display element.

At block 508, the process sends a query relating to the request to a component located on a computing device which generated the display element. In this instance, the computing device which generated the display element is designated as the server. The query may be sent over a communication means facilitated by the remote terminal session, or an independently established communication means.

At block 510, the process receives the query relating to the UI at the server side. At block 512, the process accesses UI information responsive to the query. In one such configuration, the information is obtained from the server UI via an AA-UI-interface functionality operating on the server and which is configured to obtain accessibility-related information from the UI.

At block 514, the acquired information is sent to the client. The information can be sent over the same communication means utilized to send the request at block 508 or some other suitable communication means.

At block 516, the process receives the response to the query at the client. The response can be provided to the accessibility functionality. In some instances, further processing is conducted to the response prior to providing the response to the accessibility functionality. For instance, information regarding a relative location of a display element may be adjusted to take into account other facets of the overall client display. For instance, a display element may be a portion of a UI representation received from the server. The server provided location data relative to the server UI, but the representation of the UI may comprise only a subset of the overall client display which may also include locally generated UI components and/or other remotely generated components. As such the location data can be adjusted in relation to the overall client display. In some instances, the information may be provided to an AA-UI-interface functionality acting on behalf of the AA. The AA-UI-interface may refine or in some other way prepare the information for use by the AA.

Although implementations relating to enabling accessibility functionalities in remote terminal sessions have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A computer-implemented method with computer-executable instructions that are executable by a client computing device, the method comprising:

receiving on the client computing device a representation of a user interface (UI) generated at a server computing device, wherein the UI is implemented as a server desktop on the server computing device and the representation of the UI is implemented as a remote desktop on the client computing device;

displaying the remote desktop as a bitmap on the client computing device, wherein the remote desktop comprises a representation of one or more display elements of the UI that are displayed on the client computing device without a functionality and/or an underlying information which are associated with the one or more display elements of the UI when said one or more display elements are displayed on the server computing device as a part of the server desktop;

presenting to an accessibility aid (AA) client component of an accessibility functionality on the client computing device, by an AA-UI-interface component of the accessibility functionality on the client computing device, a tree of nodes generated at the server computing device, representing which reflects the representation of one or more display elements of the UI, wherein each node of the tree of nodes corresponds to a display element of the UI, and wherein a structure and/or properties of the each tree node represents a functionality and/or an underlying information of the corresponding display element of the UI wherein the AA-U I-interface component provides access to the structure and/or properties, for the each node requesting, by the AA client component, an information regarding the representation of a display element on the remote desktop, including information regarding the server desktop that is utilized to achieve the accessibility functionality on the client computing device during a remote terminal session, wherein the AA client component requests the information from the server computing device via the AA-UI-interface component, wherein the information request is built as a byte message comprising at least one of: a reference to the display element, a list of properties to retrieve, or a filter that identifies the elements of interest;

using a processor on the client computing device for detecting a request from the accessibility functionality regarding the display element in the remote terminal session, wherein the request is propagated from the AA client component via the AA-UI-interface component on the client computing device and corresponds to the information requested by the AA client component;

sending the information request to an AA-UI interface-server component located on the server computing device, wherein the information request comprises the byte message; and, receiving a response to the information request from the server computing device, wherein the response comprises accessibility related information from the UI, regarding the representation of the display element on the remote desktop, wherein the response is presented as nodes of an object tree which reflects the representation of the one or more display elements, and wherein the AA client component provides an accessibility functionality output at the client computing device based on the response.

2. A method as recited in claim 1, wherein the display element comprises a portion of the remote desktop generated at the server computing device for the client computing device, wherein the remote desktop is displayed as a bitmap representation on the client computing device.

3. A method as recited in claim 1, wherein said sending comprises exposing an interface configured to allow the accessibility functionality to establish a virtual channel with the component.

4. A method as recited in claim 1, further comprising the accessibility functionality establishing communications with an AA-UI-interface component located on the server computing device to obtain information corresponding to the information requested by the AA client component located on the client computing device.

5. A method as recited in claim 4, wherein the establishing communications comprises providing interfaces for the accessibility functionality to communicate with the AA-UI-interface component located on the server computing device.

6. A method as recited in claim 4, wherein the enabling comprises providing interfaces for the accessibility functionality to launch one or more components configured to allow the accessibility functionality to communicate with the AA-UI-interface component located on the server computing device.

7. A method as recited in claim 1, wherein the display element comprises a single user-interface (UI) object.

8. A method as recited in claim 1, wherein receiving the response further comprises processing the response to compensate for at least one factor relating to the remote terminal session.

9. A method as recited in claim 8, wherein the at least one factor comprises adjusting location data obtained from a source of the display element to reflect a location of the display element relative to a client display.

10. A method as recited in claim 1, wherein the sending comprises sending the request over a virtual channel enabled by the accessibility functionality in the remote terminal session.

11. A computer-readable storage media comprising computer-executable instructions that, when executed by a processor, cause the processor to perform acts, comprising:

generating a user-interface (UI) on a server computing device, wherein the UI comprises one or more display elements, and wherein a display element comprises a portion of the UI which is associated with object data and/or information;

generating at the server computing device a representation of the UI, wherein the representation of the UI comprises a tree of nodes reflecting the representation of the one or more display elements of the UI;

sending the representation of the UI to a remote terminal session client, wherein the representation of the UI has a limitation of being associated with a reduced level of object data and/or information, which are associated with the one or more display elements of the UI when said one or more display elements are displayed on the server computing device wherein the remote terminal session client displays the representation of the UI as a bitmap without a functionality and/or an underlying information associated with the one or more display elements of the UI that the one or more display elements have when displayed on the server computing device;

presenting at the remote terminal session client the tree of nodes, wherein each node of the tree of nodes corresponds to a display element of the UI, and wherein a structure and/or properties of the each tree node represent a functionality and/or an underlying information of the corresponding display element of the UI, receiving a query at the server computing device relating to the UI from the remote terminal session client, wherein the query comprises at least one of: a reference to a display element of the UI, a list of properties corresponding to the display element to retrieve, or a filter that identifies the elements of interest corresponding to the display element; and wherein the query comprises a byte message;

de-serializing the byte message at the server computing device accessing object data associated with the display element at the server computing device;

acquiring an information responsive to the query from the object data associated with the display element, wherein the information responsive to the query includes information regarding the UI which is utilized by the remote terminal session client to achieve accessibility functionality locally at the remote terminal session client during a remote terminal session;

serializing the information acquired into another byte message; and sending the another byte message as a response from the server computing device to the remote terminal session client, wherein the response comprises accessibility related information from the UI, regarding the representation of the display element on the remote desktop, wherein the response is presented as nodes of an object tree which reflects the representation of the one or more display elements, and wherein the remote terminal session client provides an accessibility functionality output at the client computing device based on the response.

12. The computer-readable storage media of claim 11, wherein the accessing is accomplished by an accessibility aid-user-interface (AA-UI) interface component which is started responsive to said receiving.

13. The computer-readable storage media of claim 11, wherein the receiving is accomplished by a component which is started responsive to receiving a start-up request from the remote terminal session client.

14. The computer-readable storage media of claim 11, wherein said UI comprises a sub-tree of UI elements.

15. The computer-readable storage media of claim 11 further comprising sending the UI information to the client over a communication means enabled by a terminal services session located on the terminal services client.

16. A system, comprising:

a memory; a processor coupled to the memory;

means for receiving a representation at a client computing device of a user interface (UI) generated at a server computing device, wherein the UI is implemented as a server desktop on the server computing device;

means for displaying at the client computing device a remote desktop as a bitmap representation, wherein the remote desktop comprises a representation of one or more display elements of the UI that are displayed without a functionality and/or an underlying information associated with the one or more display elements of the UI when the one or more display elements are displayed on the server computing device as a part of the server desktop;

means for presenting to an accessibility aid (AA) client component of an accessibility functionality, by an AA-UI-interface component of the accessibility functionality, a tree of nodes generated at the server computing device reflecting the representation of one or more display elements of the UI, wherein each node of the tree of nodes represents corresponds to a display element of the UI, wherein a structure and/or properties of the each tree node represents a functionality and/or an underlying information of the corresponding display element of the UI, and wherein the AA-UI-interface component provides access to the structure and/or properties, for the each node;

means for requesting, by the AA client component, an information regarding the representation of a display element on the remote desktop, wherein the AA client component requests the information from the server computing device via the AA-UI-interface component, wherein the information request is built as a byte message comprising at least one of a reference to the display element, a list of properties to retrieve, or a filter that identifies the elements of interest, wherein the information request regarding a display element corresponds to accessibility related information from the UI that is provided locally at a client computing device for the AA client component to generate an accessibility functionality output;

means for determining if the display element is remotely generated, wherein the means for determining are executable by the processor;

means for obtaining the information regarding the representation of the display element displayed in the remote terminal session from the server computing device;

means for sending a response to the information request from the server computing device, to the client computing device wherein the response comprises accessibility related information from the UI, regarding the representation of the display element on the remote desktop, wherein the response is presented as nodes of an object tree which reflects the representation of the one or more display elements, and means for providing an accessibility functionality output at the client computing device by the AA client component based on the response wherein the means for providing the accessibility functionality output are executable by the processor.

17. A system as recited in claim 16 further comprising means for communicating with a remote source of the display element through which accessibility related information can be obtained, wherein the means for communicating are executed by the processor.

18. A system as recited in claim 17, wherein the means for communicating provide one or more interfaces through which the means for requesting can access a communication means for communicating with the remote source.

19. A system as recited in claim 18, wherein an interface provided by the means for communicating allows the means for requesting to launch a component within a process boundary of the means for communicating.

* * * * *